US009672491B2

United States Patent
Tsatalos et al.

(10) Patent No.: US 9,672,491 B2
(45) Date of Patent: Jun. 6, 2017

(54) VIRTUAL OFFICE ENVIRONMENT

(75) Inventors: Odysseas Tsatalos, San Jose, CA (US); Stratis Karamanlakis, Zografos (GR)

(73) Assignee: Upwork Global Inc., Mountain View, CA (US)

( * ) Notice: Subject to any disclaimer, the term of this patent is extended or adjusted under 35 U.S.C. 154(b) by 0 days.

(21) Appl. No.: 12/828,087

(22) Filed: Jun. 30, 2010

(65) Prior Publication Data

US 2010/0299180 A1    Nov. 25, 2010

Related U.S. Application Data

(62) Division of application No. 11/450,875, filed on Jun. 12, 2006.

(60) Provisional application No. 60/689,109, filed on Jun. 10, 2005.

(51) Int. Cl.
| | | |
|---|---|---|
| *G06Q 10/00* | (2012.01) | |
| *G06Q 10/10* | (2012.01) | |
| *G06Q 10/06* | (2012.01) | |
| *G06F 3/14* | (2006.01) | |

(52) U.S. Cl.
CPC ......... *G06Q 10/10* (2013.01); *G06Q 10/0637* (2013.01); *G06Q 10/0639* (2013.01); *G06F 3/1454* (2013.01); *G06Q 10/06311* (2013.01)

(58) Field of Classification Search
CPC .......... G06Q 10/10; G06Q 10/063; G06Q 10/063112; G06Q 10/0637; G06Q 10/0639; G06Q 10/06311; G06F 3/1454
USPC .............. 705/11, 7.13, 7.27, 7.38, 7.36
See application file for complete search history.

(56) References Cited

U.S. PATENT DOCUMENTS

| | | | |
|---|---|---|---|
| 5,557,515 A * | 9/1996 | Abbruzzese et al. | 705/7.15 |
| 5,966,130 A * | 10/1999 | Benman, Jr. | 345/418 |
| 6,092,049 A | 7/2000 | Chislenko et al. | |
| 6,173,332 B1 * | 1/2001 | Hickman | 709/235 |
| 6,226,031 B1 * | 5/2001 | Barraclough et al. | 348/14.13 |
| 6,385,620 B1 | 5/2002 | Kurzius et al. | |
| 6,591,011 B1 | 7/2003 | Nielsen | |
| 6,662,194 B1 | 12/2003 | Joao | |
| 6,735,570 B1 | 5/2004 | Lacy et al. | |
| 6,832,176 B2 * | 12/2004 | Hartigan et al. | 702/178 |
| 6,859,523 B1 | 2/2005 | Jilk et al. | |
| 6,871,181 B2 | 3/2005 | Kansai | |
| 7,096,193 B1 | 8/2006 | Beaudoin et al. | |
| 7,466,810 B1 | 12/2008 | Quon et al. | |
| 7,505,919 B2 | 3/2009 | Richardson | |
| 7,752,080 B1 | 7/2010 | Greener | |
| 7,814,085 B1 | 10/2010 | Pfleger et al. | |
| 8,224,755 B2 | 7/2012 | Goodman et al. | |
| 8,512,143 B2 | 8/2013 | Jung et al. | |

(Continued)

OTHER PUBLICATIONS

Two Cheers for Virtual Office—by Davenport and Pearlson Sloan Management Review Summer 1998.*

(Continued)

*Primary Examiner* — Beth V Boswell
*Assistant Examiner* — Abhijit B Sadananda
(74) *Attorney, Agent, or Firm* — Haverstock & Owens LLP

(57) ABSTRACT

A system and method for monitoring remote employees, having a computer for a user to perform job related tasks, wherein the computer is enabled to record various data regarding the user's use of the computer, and a network to transmit the various data to a storage unit, to allow the data to be accessed by an employer.

26 Claims, 18 Drawing Sheets

(56) References Cited

U.S. PATENT DOCUMENTS

| | | | |
|---|---|---|---|
| 8,856,670 B1 | 10/2014 | Thakur et al. | |
| 2001/0034630 A1 | 10/2001 | Mayer et al. | |
| 2001/0034688 A1 | 10/2001 | Annunziata | |
| 2001/0041988 A1 | 11/2001 | Lin | |
| 2001/0051913 A1* | 12/2001 | Vashistha et al. | 705/37 |
| 2002/0010685 A1 | 1/2002 | Ashby | |
| 2002/0120554 A1 | 8/2002 | Vega | |
| 2002/0129139 A1* | 9/2002 | Ramesh | 709/224 |
| 2002/0161707 A1 | 10/2002 | Cole et al. | |
| 2003/0014294 A1 | 1/2003 | Yoneyama et al. | |
| 2003/0086608 A1 | 5/2003 | Frost et al. | |
| 2003/0097305 A1 | 5/2003 | Ogino et al. | |
| 2003/0191684 A1 | 10/2003 | Lumsden et al. | |
| 2003/0204367 A1* | 10/2003 | Hartigan et al. | 702/178 |
| 2003/0210246 A1 | 11/2003 | Congdon et al. | |
| 2003/0212627 A1 | 11/2003 | Burns et al. | |
| 2003/0220843 A1 | 11/2003 | Lam | |
| 2004/0064436 A1 | 4/2004 | Breslin et al. | |
| 2004/0103167 A1 | 5/2004 | Grooters et al. | |
| 2004/0128224 A1 | 7/2004 | Dabney | |
| 2004/0215560 A1 | 10/2004 | Amalraj et al. | |
| 2004/0230511 A1 | 11/2004 | Kannan et al. | |
| 2005/0015642 A1* | 1/2005 | Hannel et al. | 714/4 |
| 2005/0043548 A1* | 2/2005 | Cates | 549/12 |
| 2005/0043998 A1 | 2/2005 | Bross | |
| 2005/0046699 A1* | 3/2005 | Oya et al. | 348/207.1 |
| 2005/0222907 A1 | 10/2005 | Pupo | |
| 2006/0031177 A1 | 2/2006 | Rule | |
| 2006/0195428 A1 | 8/2006 | Peckover | |
| 2006/0212359 A1 | 9/2006 | Hudgeon | |
| 2006/0284838 A1* | 12/2006 | Tsatalos et al. | 345/156 |
| 2007/0022040 A1 | 1/2007 | Gordon | |
| 2007/0061144 A1 | 3/2007 | Grichnik et al. | |
| 2007/0112671 A1 | 5/2007 | Rowen | |
| 2007/0130059 A1 | 6/2007 | Lee et al. | |
| 2007/0174180 A1 | 7/2007 | Shin | |
| 2007/0192130 A1 | 8/2007 | Sandhu | |
| 2007/0233510 A1 | 10/2007 | Howes | |
| 2008/0059523 A1 | 3/2008 | Schmidt et al. | |
| 2008/0154783 A1 | 6/2008 | Rule | |
| 2008/0194228 A1 | 8/2008 | Pousti et al. | |
| 2008/0288582 A1 | 11/2008 | Pousti et al. | |
| 2008/0313005 A1 | 12/2008 | Nessland | |
| 2009/0055404 A1 | 2/2009 | Heiden et al. | |
| 2009/0055476 A1 | 2/2009 | Markus et al. | |
| 2009/0150386 A1 | 6/2009 | Lichtblau | |
| 2009/0288021 A1 | 11/2009 | Loffe | |
| 2010/0017253 A1 | 1/2010 | Butler et al. | |
| 2010/0144318 A1 | 6/2010 | Cable | |
| 2010/0162167 A1 | 6/2010 | Stallings et al. | |
| 2010/0299180 A1* | 11/2010 | Tsatalos et al. | 705/9 |
| 2011/0106762 A1 | 5/2011 | Dane | |
| 2011/0302053 A1 | 12/2011 | Rigole | |
| 2013/0325734 A1 | 12/2013 | Bixler et al. | |
| 2014/0164271 A1 | 6/2014 | Forman et al. | |

OTHER PUBLICATIONS

United States Office Action, U.S. Appl. No. 11/450,875, filed Oct. 10, 2013, sixteen pages.

European Patent Office, Examination Report, European Patent Application No. 06772873.3, May 8, 2013, seven pages.

European Patent Office, Extended European Search Report, Patent Application No. EP 06772873.3, Nov. 11, 2010, six pages.

Anonymous, "oDesk: Developer's Suite," Mar. 8, 2005, one page. [Online] [Retrieved Sep. 24, 2010] Retrieved from the Internet <http://web.archive.org/web/20050308045643/www.odesk.com/dev_suit.php.>.

Anonymous, "oDesk: Manage," Mar. 8, 2005, two pages. [Online] [Retrieved Sep. 24, 2010] Retrieved from the Internet <http://web.archive.org/web/20050308051750/www.odesk.com/manage.php.>.

Anonymous, "oDesk: Overview," Mar. 8, 2005, one page. [Online] [Retrieved Sep. 24, 2010] Retrieved from the Internet <http://web.archive.org/web/20050308034244/www.odesk.com/overview.php.>.

Anonymous, "oDesk: Pay," Mar. 8, 2005, one page. [Online] [Retrieved Sep. 24, 2010] Retrieved from the Internet <http://web.archive.org/web/20050308053002/www.odesk.com/pay.php.>.

Anonymous, "oDesk: Share," Mar. 8, 2005, two pages. [Online] [Retrieved Sep. 24, 2010] Retrieved from the Internet <http://web.archive.org/web/20050308052047/www.odesk.com/share.php.>.

Anonymous, "oDesk: Team," Mar. 8, 2005, two pages. [Online] [Retrieved Sep. 24, 2010] Retrieved from the Internet <http://web.archive.org/web/20050308052318/www.odesk.com/team.php.>.

Anonymous, "oDesk: Testimonials," Mar. 8, 2005, one page. [Online] [Retrieved Sep. 24, 2010] Retrieved from the Internet <http://web.archive.org/web/20050308011817/www.odesk.com/testimonials.php.>.

Paolucci et al., "Semantic Matching of Web Services Capabilities", 2002, Carnegie Mellon University, Pittsburgh, PA, USA.

* cited by examiner

VIRTUAL OFFICE ENVIRONMENT

CROSS-REFERENCE TO RELATED APPLICATION

This application is a divisional application under 35 U.S.C. 121 of, and claims priority under 35 U.S.C. 120 to co-pending U.S. patent application Ser. No. 11/450,875 filed on Jun. 12, 2006, which claims priority under 35 U.S.C. 119(e) to U.S. Provisional Application Ser. No. 60/689,109 filed on Jun. 10, 2005, which are incorporated by reference herein in their entirety.

FIELD OF THE INVENTION

This invention relates generally to methods and systems for creating and monitoring a networked virtual office environment.

BACKGROUND

Currently existing computer applications can be used for monitoring user activities such as reading mail written by a user, viewing web sites visited by a user, monitoring programs used by a user, recording a user's keystrokes, logging inactivity timeouts, saving activity logs, logging both sides of chat and instant message conversations for various messengers, recording changes made to a hard drive, storing lists of created files and directories, storing lists of deleted files and directories, and capturing information through screen shots. Existing applications also provide access to remote computers and allow administrators to shut down, restart, logoff, message or freeze a single user or all users on a network.

These known applications have limitations such as automatically suspending an application from monitoring the computer if the computer is inactive for a specified amount of time, only monitoring activities of a slave computer, and not remotely viewing the archived information or statistics.

SUMMARY OF THE INVENTION

Known systems do not provide a integrated environment in which to a) select and identify potential workers, b) analyze and review historical user activity or data logs of monitored worker activity and provide productivity analysis, and c) effect payment of those workers. It has been determined that a system capable of performing such functions would be a significant improvement in that such a system could reduce associated costs while improving the usefulness and reliability of the system.

BRIEF DESCRIPTION OF THE DRAWINGS

The accompanying figures together with the detailed description below are incorporated in and form part of the specification, serve to further illustrate various embodiments and to explain various principles and advantages all in accordance with the present invention, and should not be construed to limit the invention.

DETAILED DESCRIPTION

The following description sets forth numerous specific configurations, parameters, and the like. It should be recognized, however, that such description is not intended as a limitation on the scope of the present invention, but is instead provided as a description of exemplary embodiments.

The embodiments described herein are directed to methods and systems for creating a virtual office environment for assessing a remote user's or worker's productivity by connecting through a network. These embodiments can provide direct, cost-effective access to a global inventory of remote, knowledge workers by providing convenient execution of the steps of hiring, managing, and paying.

Figure 10A:
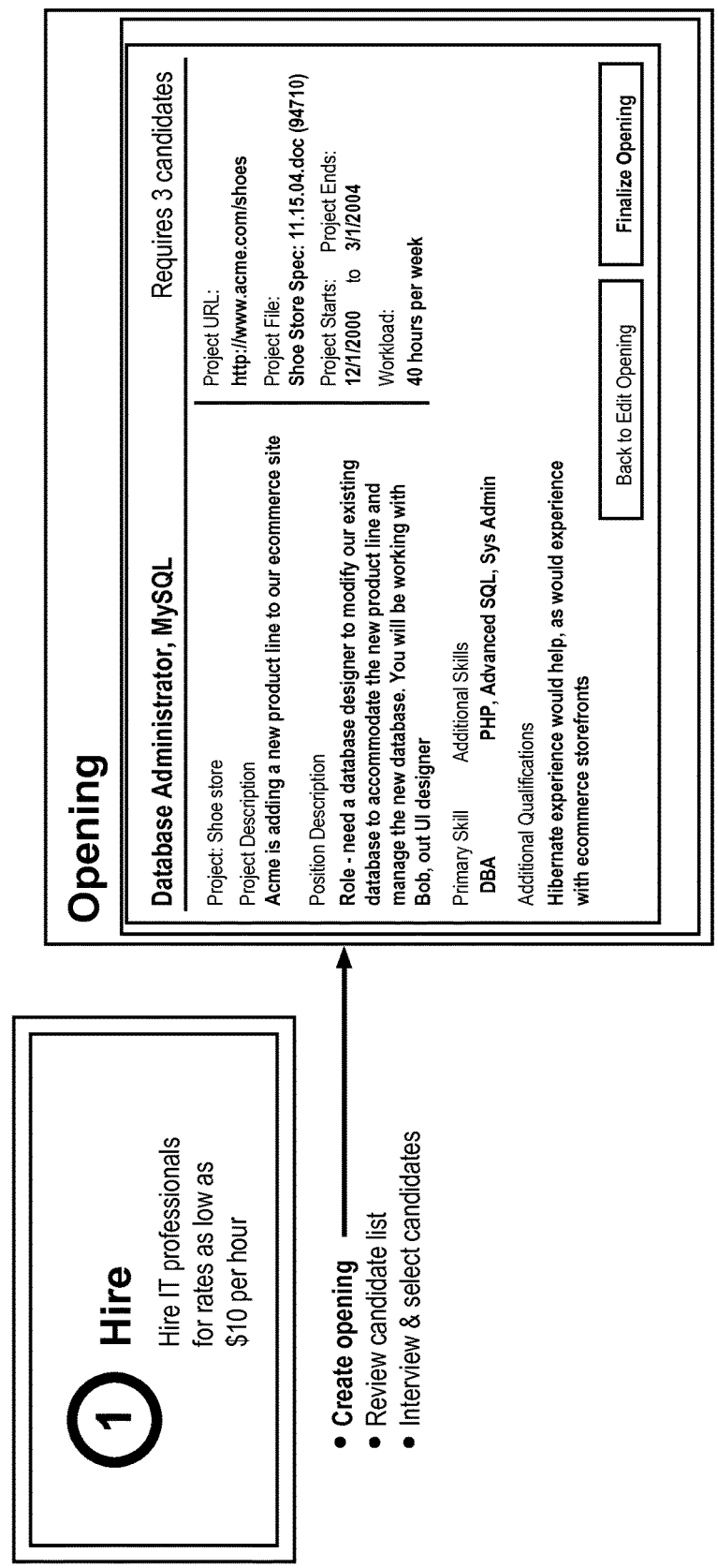
FIGS. 10A-C illustrate an exemplary process for hiring workers.
Figure 10B:
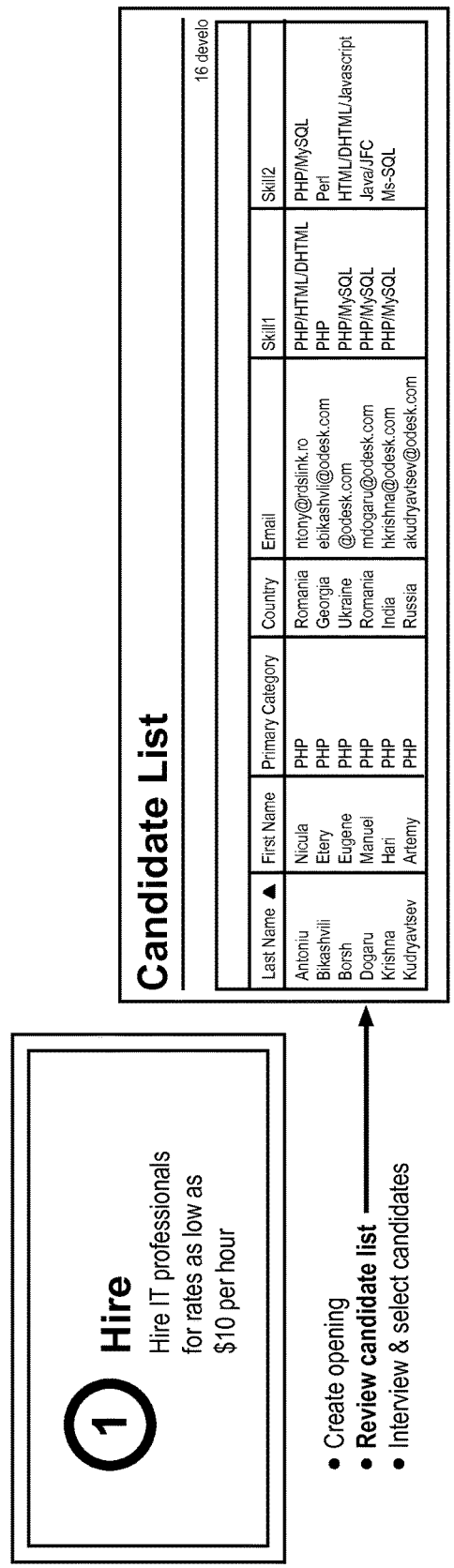
Figure 10C:
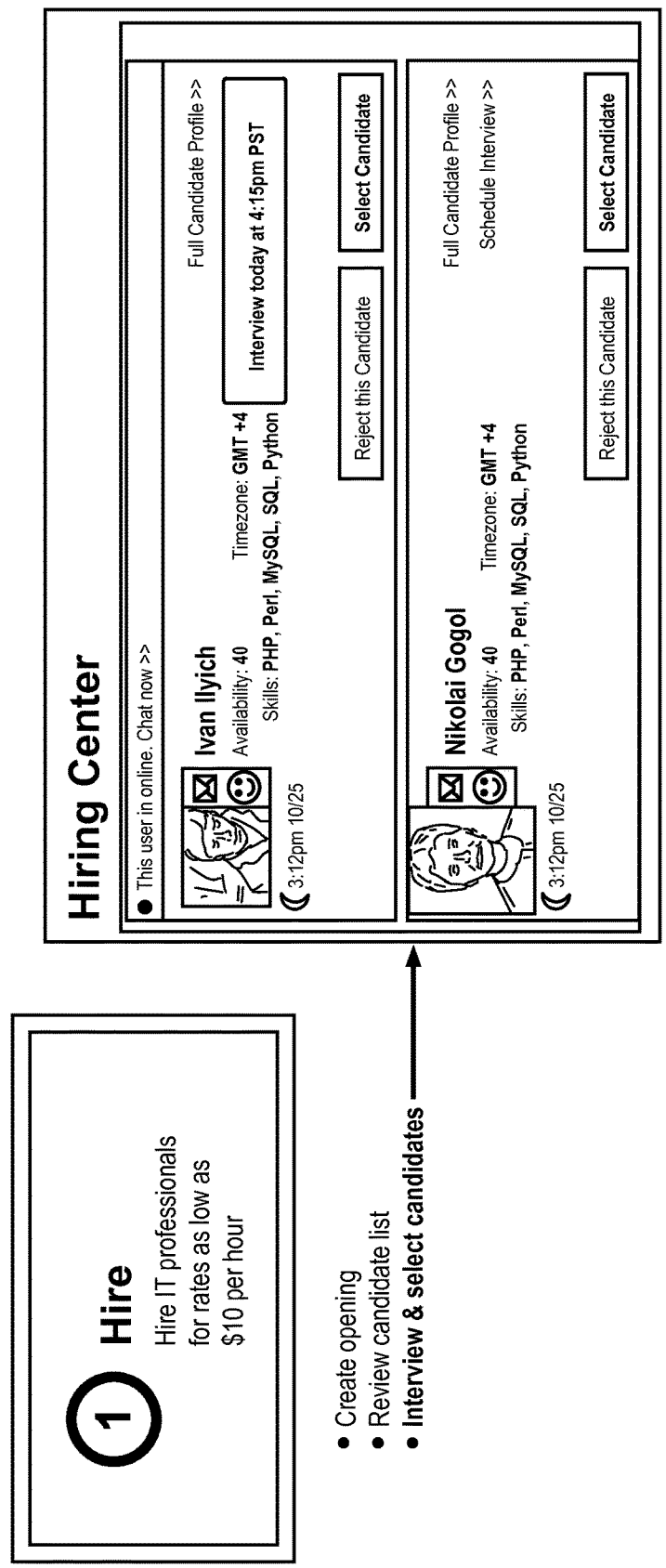

In one embodiment of the invention, a system allows a manager to build a qualified pool of skilled and knowledgeable workers regardless of where the workers are located. In one aspect of the invention, the pool of workers comprises workers located in several diverse regions of the world. By selecting workers from a pool that is not geographically restricted, an employer is able to be much more selective of the employees that it chooses to hire. The selections may be made based on at least the qualifications of candidates and/or the cost associated with the candidates. The costs associated with hiring employees may vary greatly depending on where the potential employees are located geographically. According to a further aspect of the invention, a list of candidates may be recommended by the system, and the recommended candidates may then be accessed such that employees may optionally be hired there from. An exemplary embodiment showing at least these features is illustrated in FIGS. 10A-C.

Figure 9:
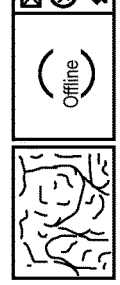
FIG. 9 illustrates an exemplary console view of a team.
Figure 11A:
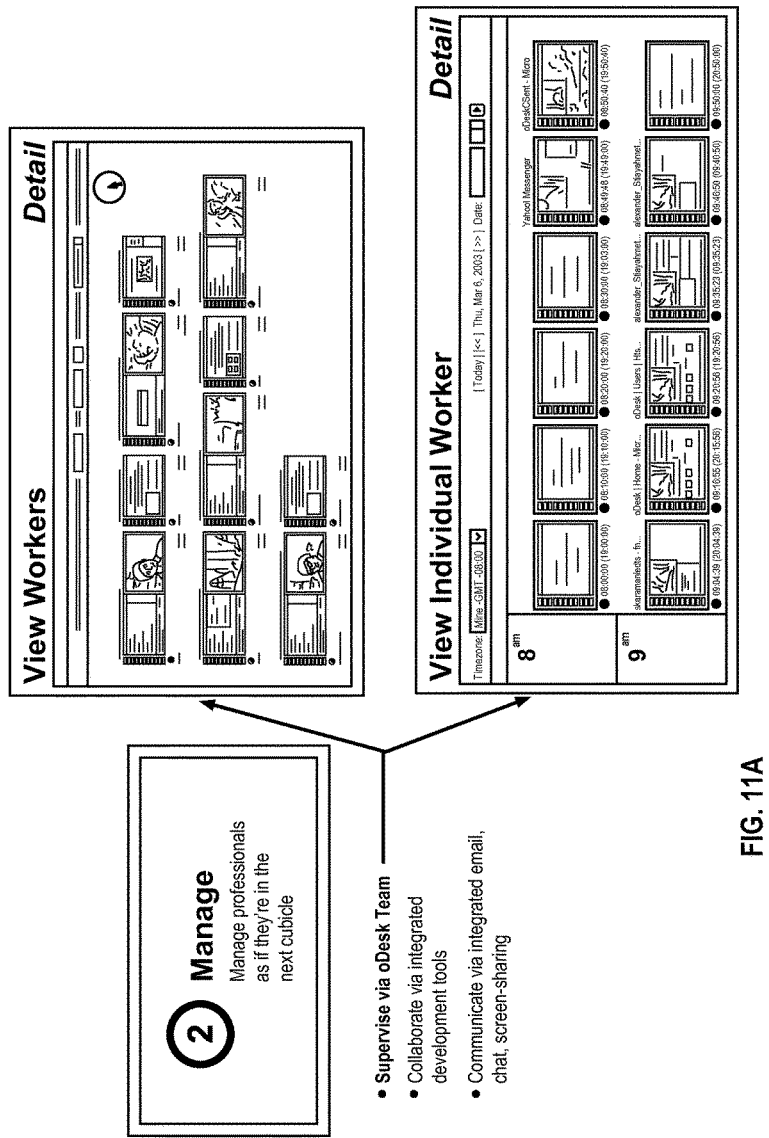
FIGS. 11A-C illustrate an exemplary process for managing workers.
Figure 11B:
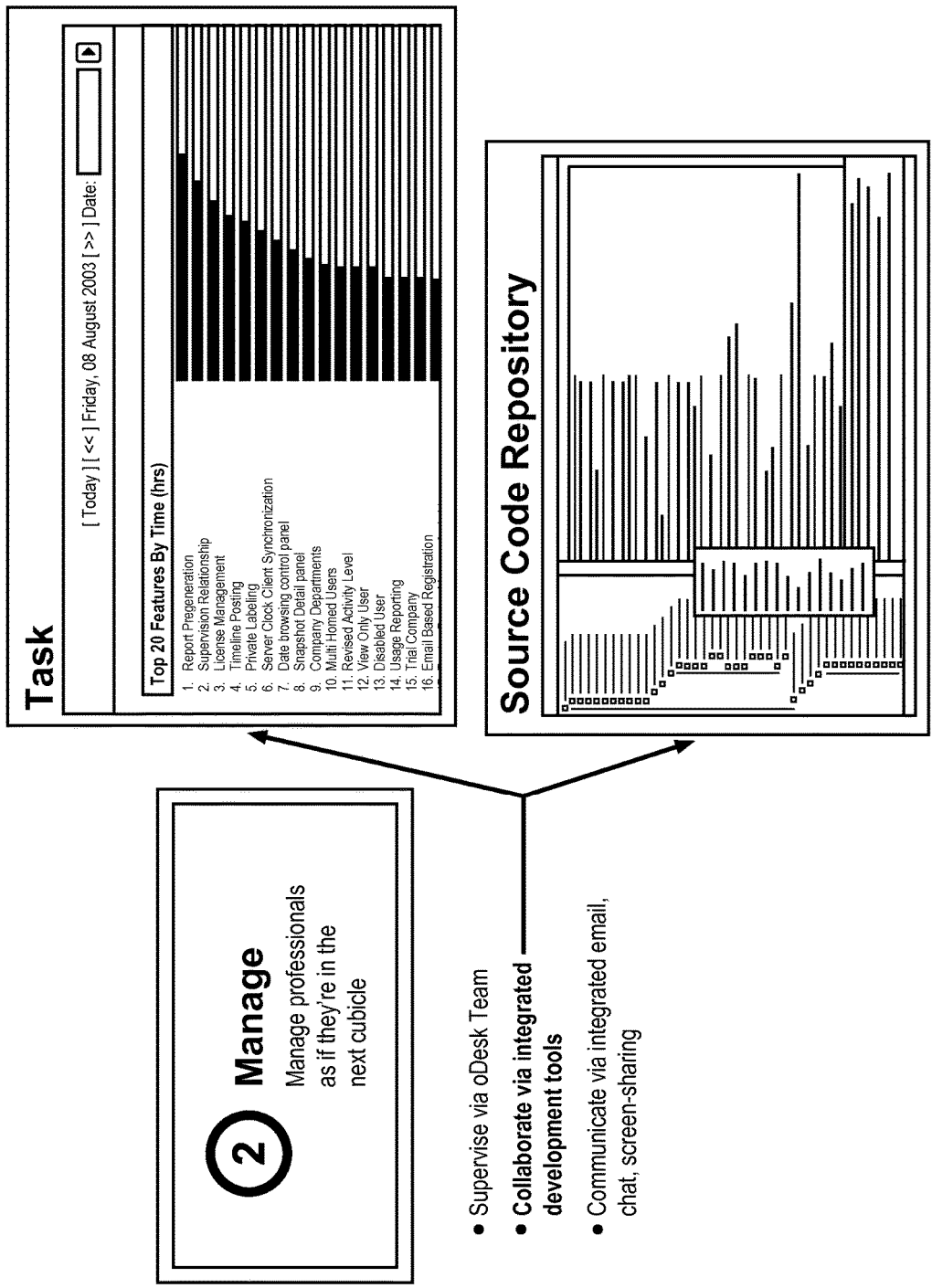
Figure 11C:
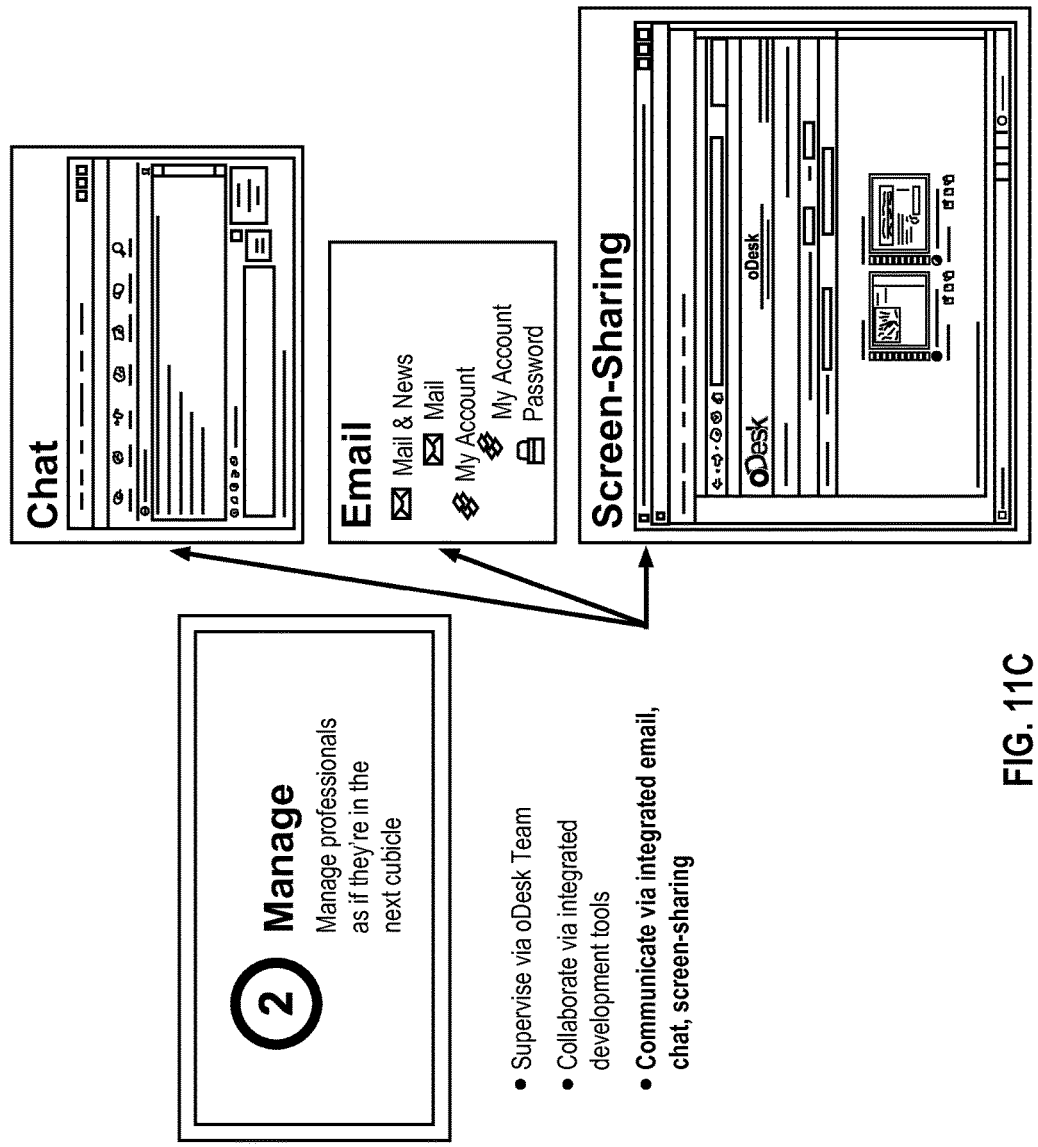

According to further embodiments of the invention, direct access to and management of a pool of workers can be provided via a proprietary or standards-based platform for worker management, time and billing, collaboration, and communications. FIG. 9 depicts an exemplary console view showing a team of workers. An exemplary embodiment depicting a system having at least these features is illustrated in FIGS. 11A-C. The system may include: an authenticated login to make a worker visible to a manager, tracking work hours performed for automatic time and billing, creation of a context-full archive of past work for auditing purposes, providing to a manager a real-time view of at least one worker on a team, and/or providing real-time productivity reports across time for at least one worker or team.

Figure 12A:
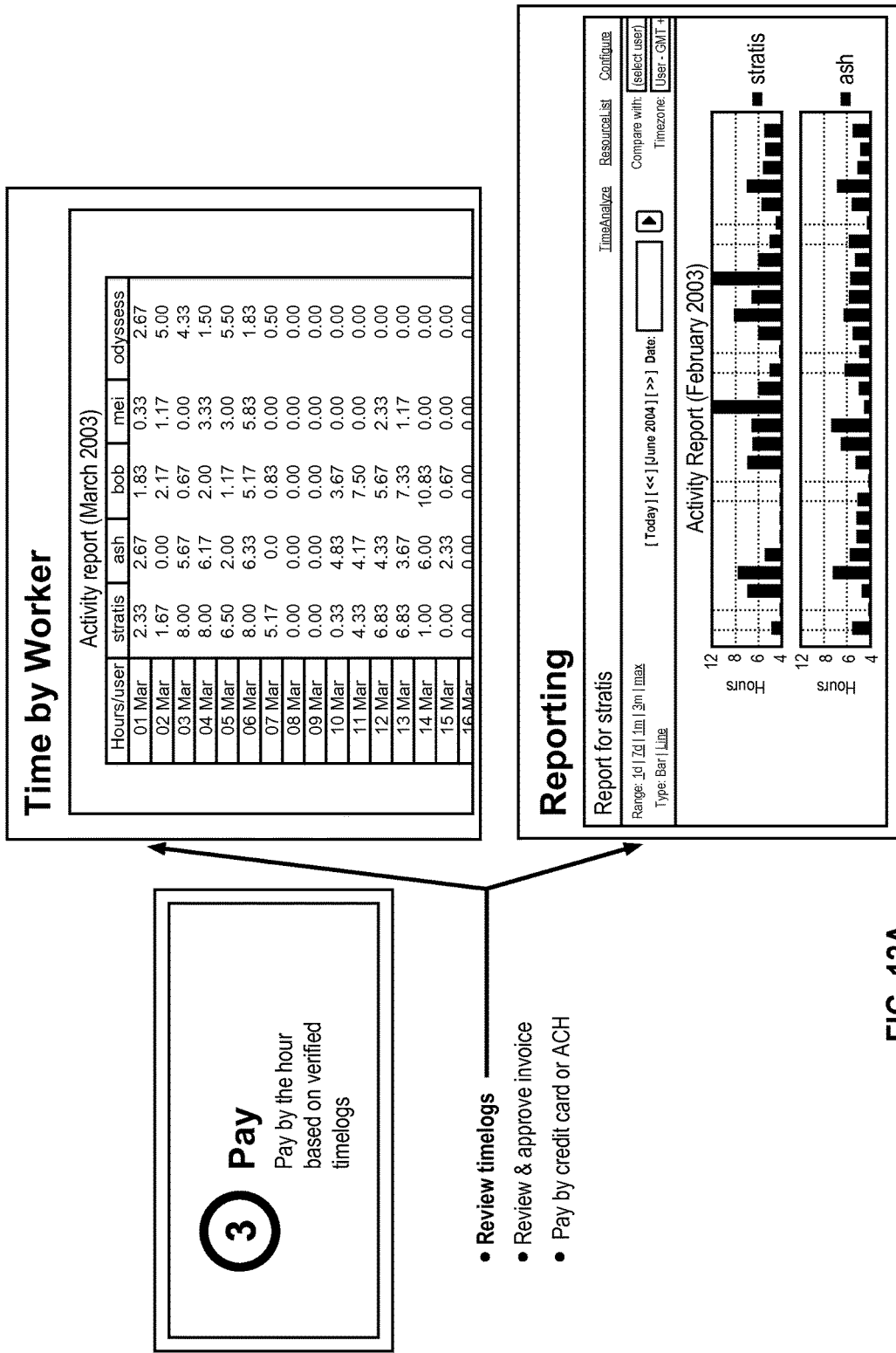
FIGS. 12A-B illustrate an exemplary process for paying workers.
Figure 12B:
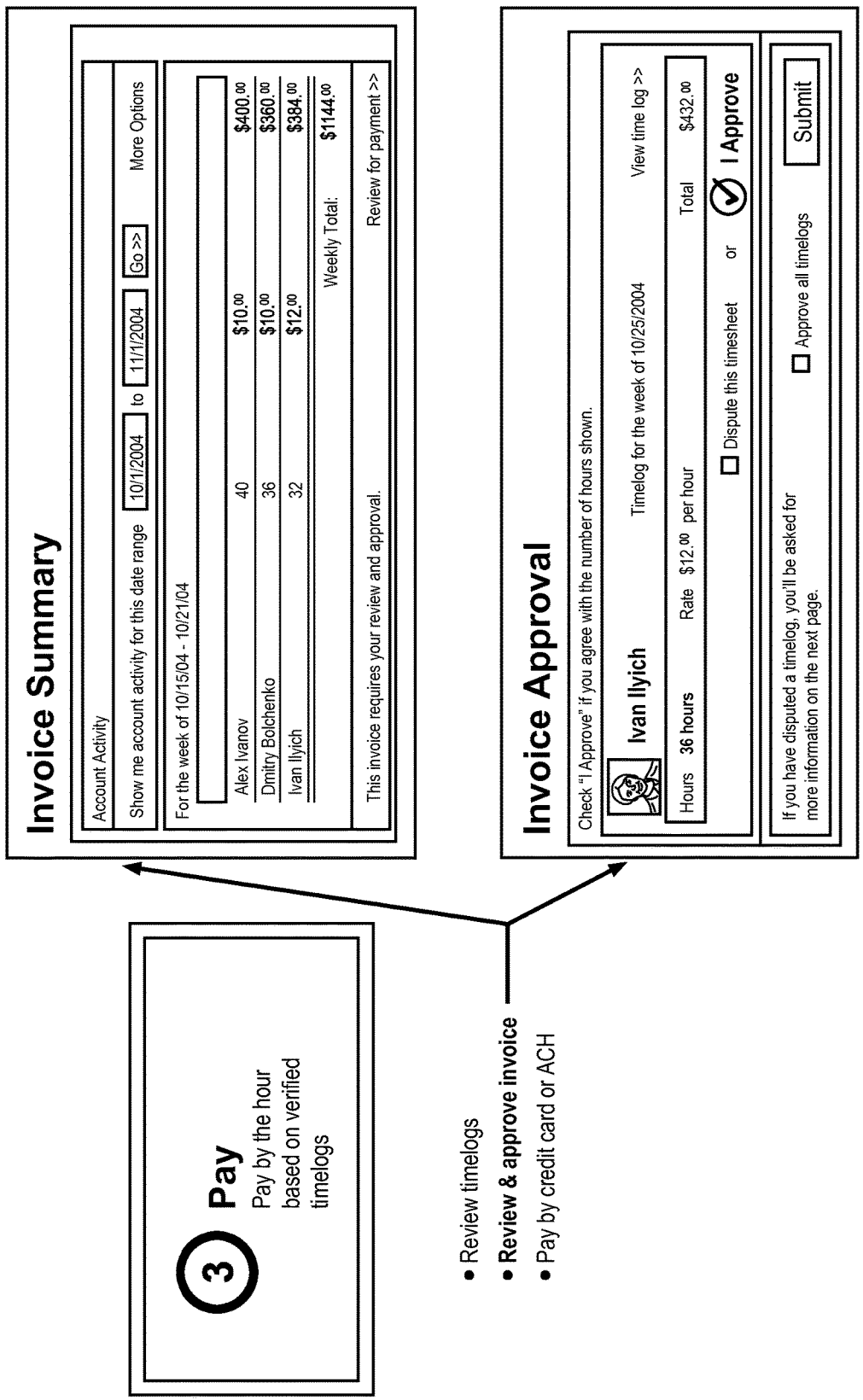
Figure 13:
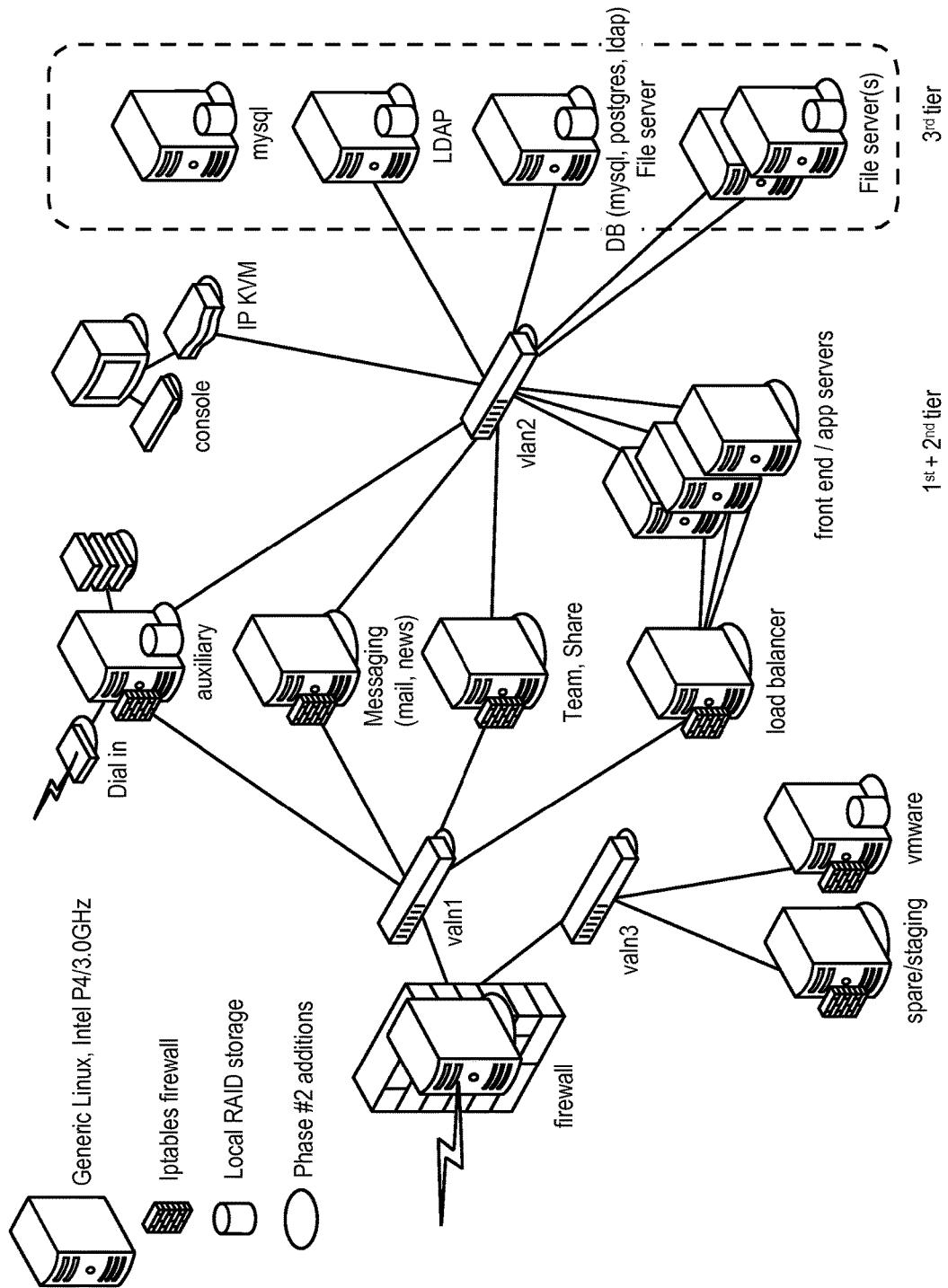
FIG. 13 illustrates an exemplary network architecture.

According to further embodiments of the invention, payment can be made from an employer to an employee/worker for each hour worked, based on auditable timelogs. An exemplary embodiment of such an embodiment is illustrated in FIGS. 12A-B. A further embodiment of the invention can include creation of time-log invoices with drill-downs into actual work performed and a payment infrastructure for reaching local, regional, national or international workers. By using a system incorporating these features an employer can be charged for services in real time as they are being performed, and workers can receive compensation for their efforts on a similarly timely schedule.

By compensating employees in this manner, both the employers and the employees can minimize the lag times that are often associated with contract work. For example, employees will no longer have to wait until the conclusion of a job to receive compensation as happens in some systems. On the other hand, employers can avoid having to make lump sum payments at the beginning or end of a contract. As an additional benefit, an embodiment of the invention using this system can avoid a potential loss of money due to fraud and/or poor employee performance. By only compensating employees for work which has been tracked and verified, an employer can avoid paying for work which was not done, the employer can also identify poor employees quickly by looking for employees who do not produce quickly enough. If such non-efficient employees are discovered and terminated quickly, an employer may be able to save a considerable amount of money as compared to a situation where employees are only held accountable on a bi-weekly or monthly basis.

In various embodiments of the invention, the above features can be provided through an integrated communication, collaboration and development environment. In such an environment, a user can have access to a team's shared collaboration and/or development environment. In some embodiments of the environment, synchronous chat, voice, or video communication links can be established between a worker, manager, and co-worker.

Figure 1:
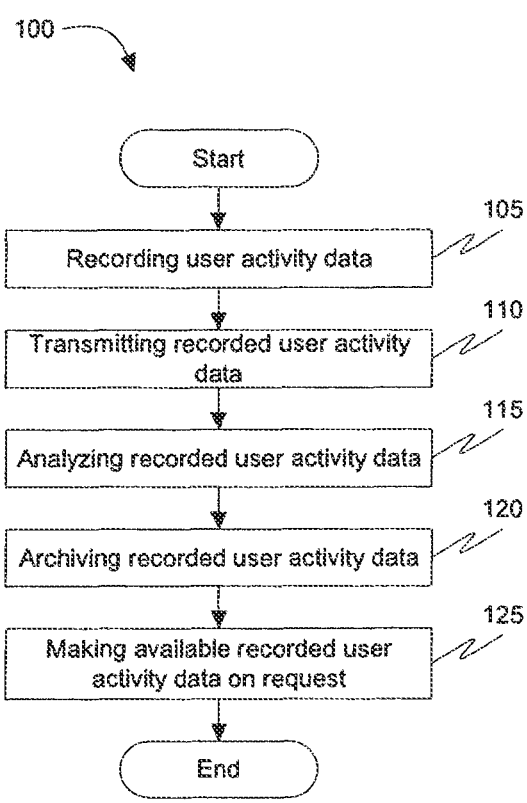
FIG. 1 illustrates an embodiment for recording, transmitting, analyzing, archiving, and providing user activity data.

An exemplary embodiment (100) is shown in FIG. 1. This embodiment includes recording user activity data (105). User activity data may be recorded through the use of one or more configurable system conduits. User activity can be recorded using recorder software installed on a user computer.

Various forms of user activity can be recorded and stored as user activity data. Examples of user activity data may include, but are not limited to, data input to a user computer by a user or another device in communication with a user computer or execution of any process, routine or function on the user computer called by any of the user, an operating system and/or another process. The recorded user activity can include user activity data having a series of steps such as providing an input data to a user computer or running any one of various functions and/or procedures. The configurable system conduits can perform the steps of defining the user activity to be captured, tracking the user activity, defining a time period during which the user activity is to be captured, and defining a mode of access to the analyzed user activity data.

User activity data can include one or more keyboard strokes and/or mouse clicks. Image and/or audio input from a camera located proximate to the user can also be recorded. User activity can also include the running of a system function on the user computer, monitoring one or more active windows and the active running time of the active windows.

Figure 2:
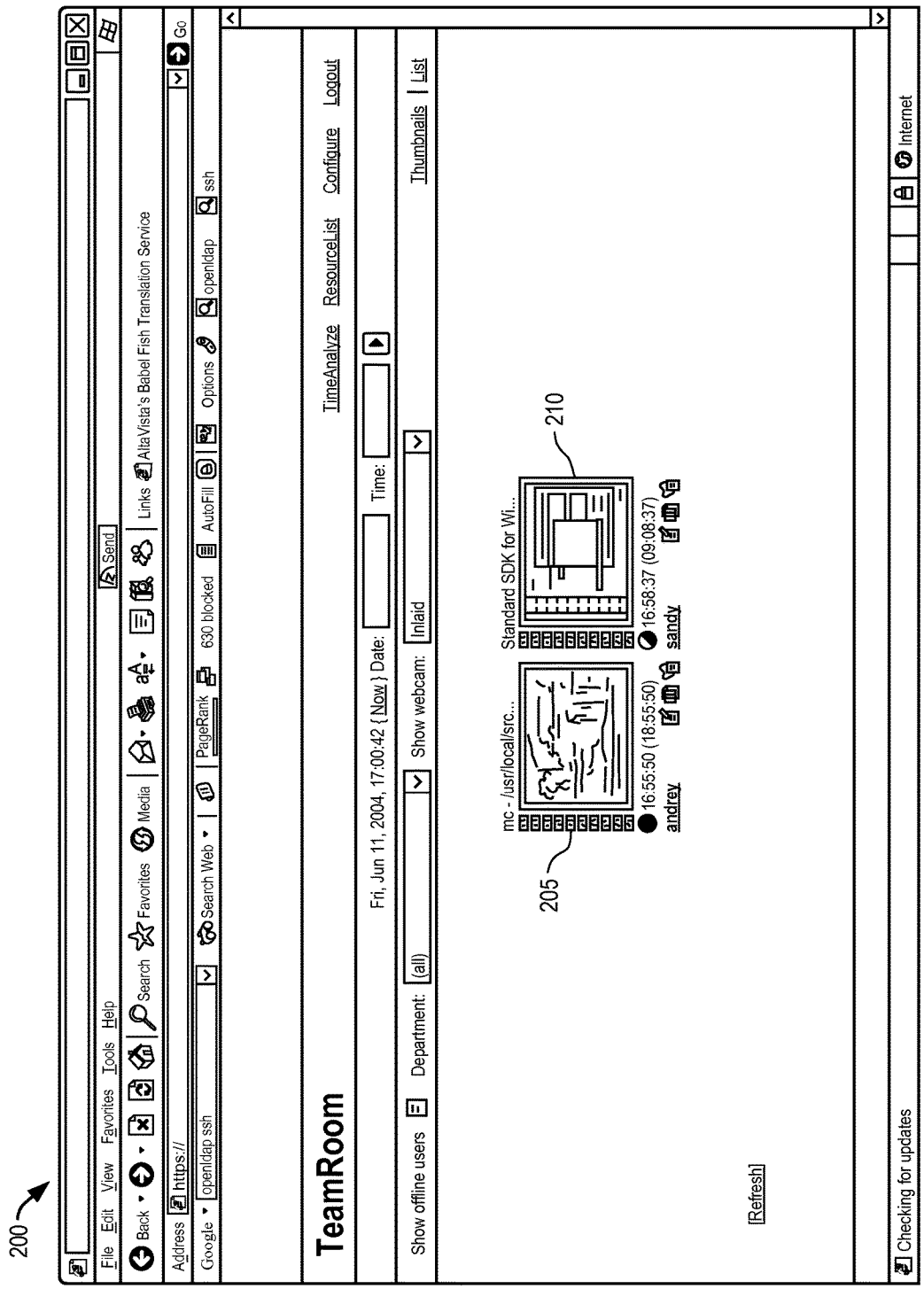
FIG. 2 illustrates an embodiment for recording or monitoring user activity.
Figure 3:
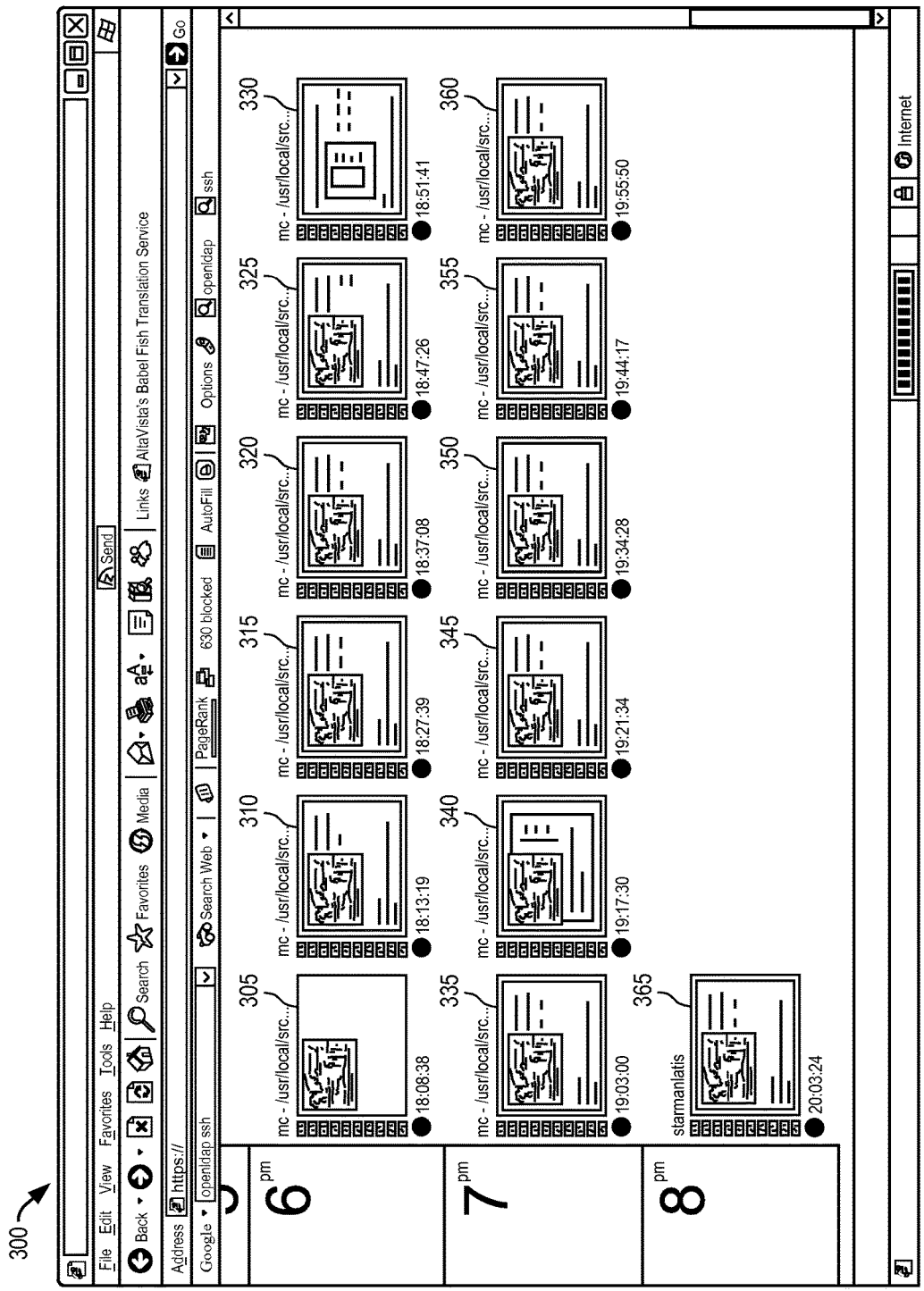
FIG. 3 illustrates an embodiment for recording user activity at different time intervals or points in time.

The tracking or recording of user activity can be based on a definition of the user activity to be captured, a time span during which the user activity is to be captured, or the mode used to access the analyzed user activity data. An interface of one exemplary embodiment is shown in FIG. 2. In this embodiment (200), screen images are shown from two users, "andrew" (205) and "sandy" (210). In another exemplary embodiment (300) shown in FIG. 3, a user activity is seen to be carried out by a user at different time intervals.

In some embodiments of the invention, a project manager or other individual may define conduits based on the remote team's tasks or activities performed by the remote team. The step of defining a mode of access to the analyzed user activity data of the configurable system conduits can further comprise steps of defining a workspace for a plurality of the user computers. Defining the workspace can include configuring one or more permissions for access to analyzed user activity data. In some embodiments, access permissions to recorded conduits can be configured based on a grouping so that they can be presented to a manager as a unified workspace. A workspace can have one or more modes of operation, and one or more of those modes may be associated with different access permissions.

Some embodiments can further comprise transmitting recorded user activity data (110), analyzing recorded user activity data (115), archiving the user activity data (120), and making user activity data available to another party. The data archived can either be in a raw form or the data archived can be an analysis or distillation of user activity. The archived data can be stored in a central repository or at one or more distributed repositories. The raw or analyzed user activity data can be made available (125) to one or more requesters through server software over a communications channel using a standard browser application. In other embodiments, a proprietary or custom client can be used to access the user activity data through a browser or independently of a browser. In some embodiments, a manager can review archived data using a web-based graphical user interface. The system described herein can be configured to store and retrieve user data for variable user or manager-defined periods.

As shown in FIG. 1, some embodiments can include transmitting the recorded user activity data (110). In some such embodiments, recorded user activity data can be transmitted using the Hypertext Transfer Protocol over Secure Socket Layer (HTTP over SSL) protocol over Transmission Control Protocol/Internet Protocol (TCP/IP) to a server computer. Other mechanisms and methods for transmission are possible. This server computer can be accessed by a project manager. Some embodiments can also include the step of analyzing the recorded user activity data (115) using one or more management tools.

Figure 4:
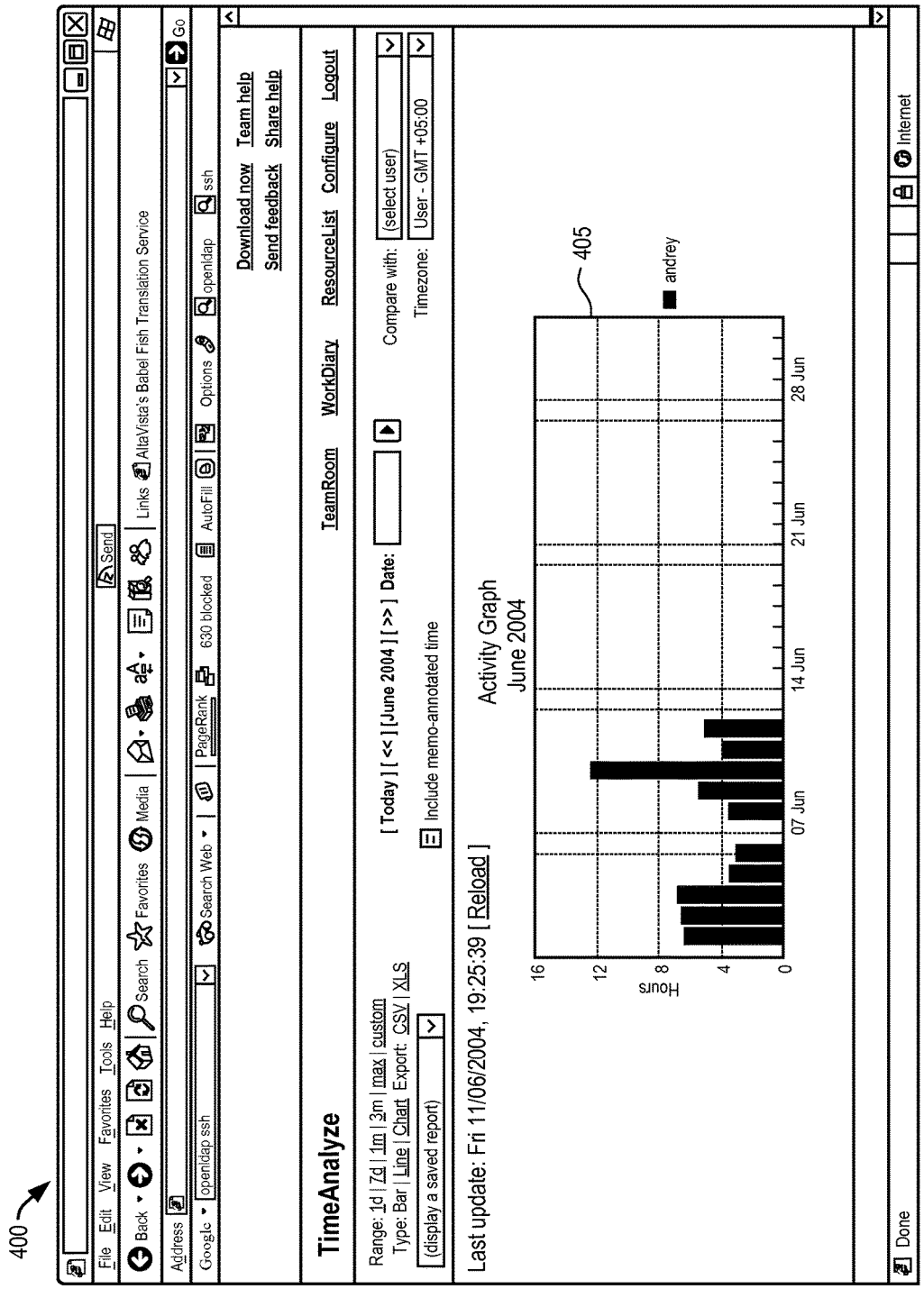
FIG. 4 illustrates an embodiment for analyzing recorded user activity during a particular period.

In one exemplary embodiment shown in FIG. 4, a browser window (400) presents an analysis of user activity (405). As a non-limiting example, it can be seen that browser window (400) illustrates an analysis of activities by a user "andrew" during the month of June.

Figure 5:
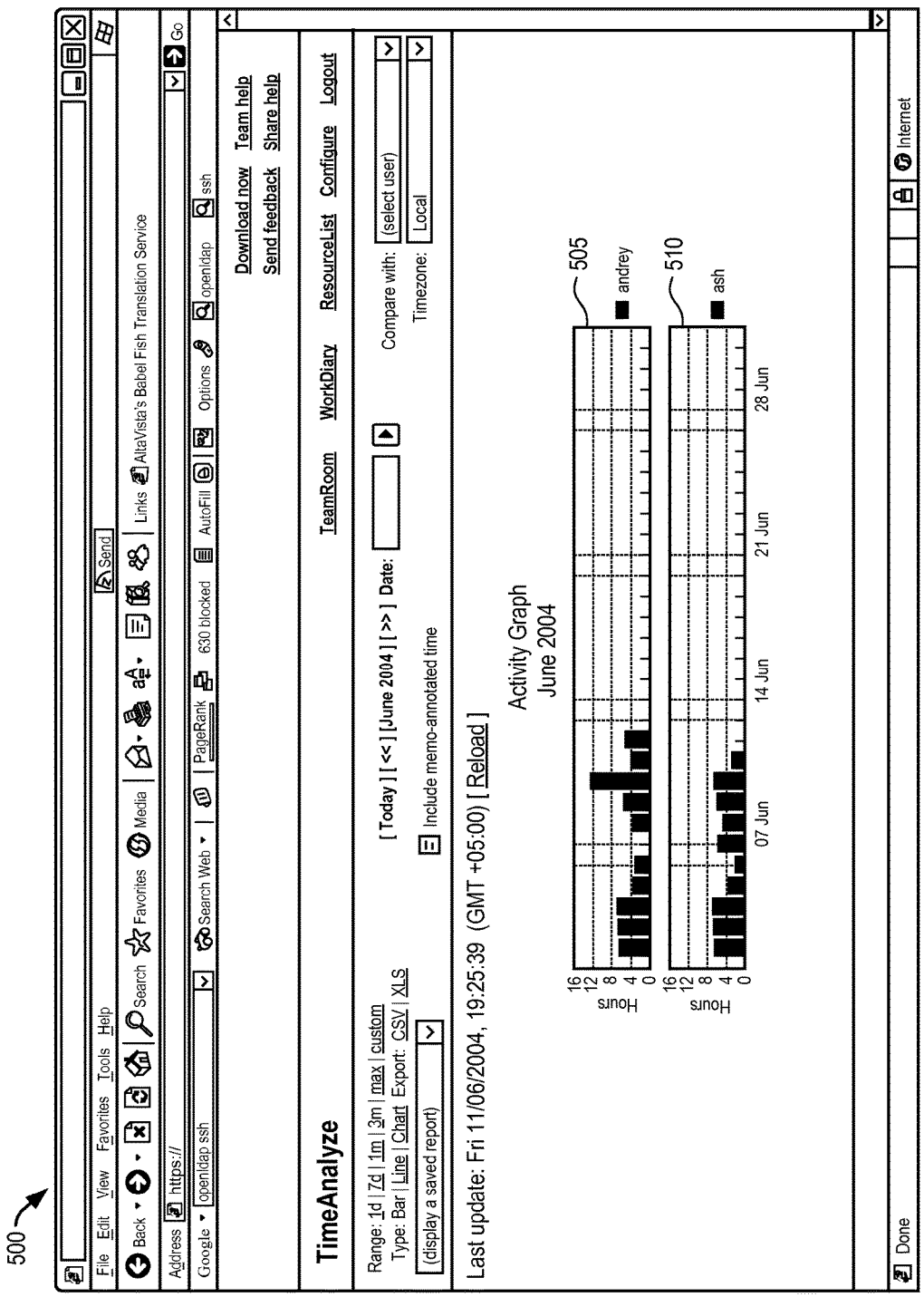
FIG. 5 illustrates an embodiment for analyzing recorded user activity for more than one user during a particular period.

In another exemplary embodiment shown in FIG. 5, a browser window (500) presents analysis of user activity by users "andrew" (505) and "ash" (510) during the month of June.

Figure 6:
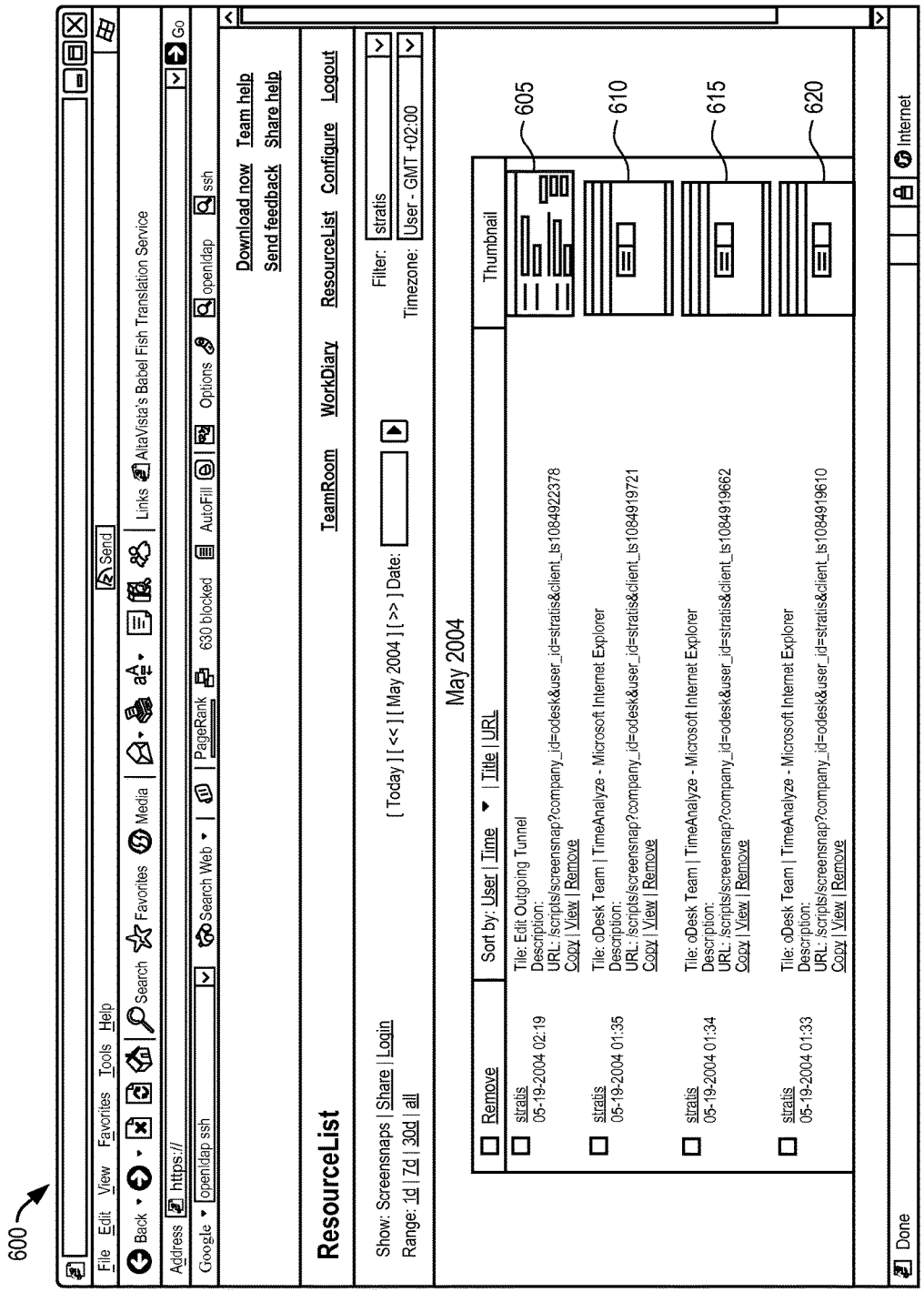
FIG. 6 illustrates an embodiment for displaying recorded user activity for a particular period.

In another exemplary embodiment shown in FIG. 6, a browser window (600) presents archived user activity data for a particular time period.

Figure 7:
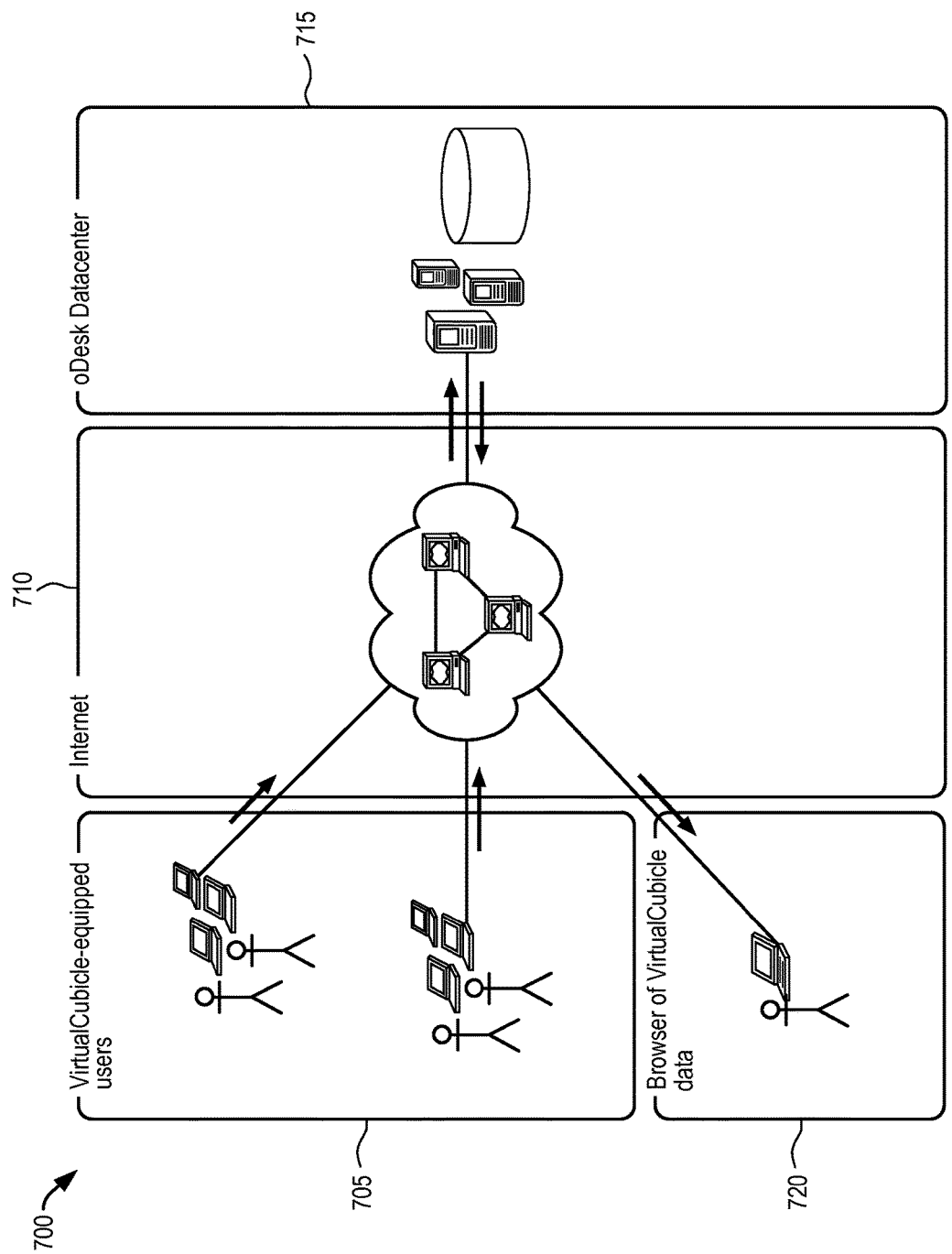
FIG. 7 illustrates an embodiment for networking in a virtual office environment.

An exemplary network architecture (700) of one embodiment is shown in FIG. 7. The illustrated embodiment can include recorder software installed on one or more user computers (705). The one or more user computers (705) can be in communication with server software on a one or more server computers (715) through the Internet (710). The recorder software and one or more configurable conduits can be configured to record user activity data that can then be transmitted to one or more servers (715). The one or more server computers (715) can be configured to be in communication with one or more management tools for analyzing user activity data and storing the raw or analyzed user activity data in a central or distributed repository. The one or more repositories can be in communication with one or more requestors (720) to make the user activity data available.

Figure 8:
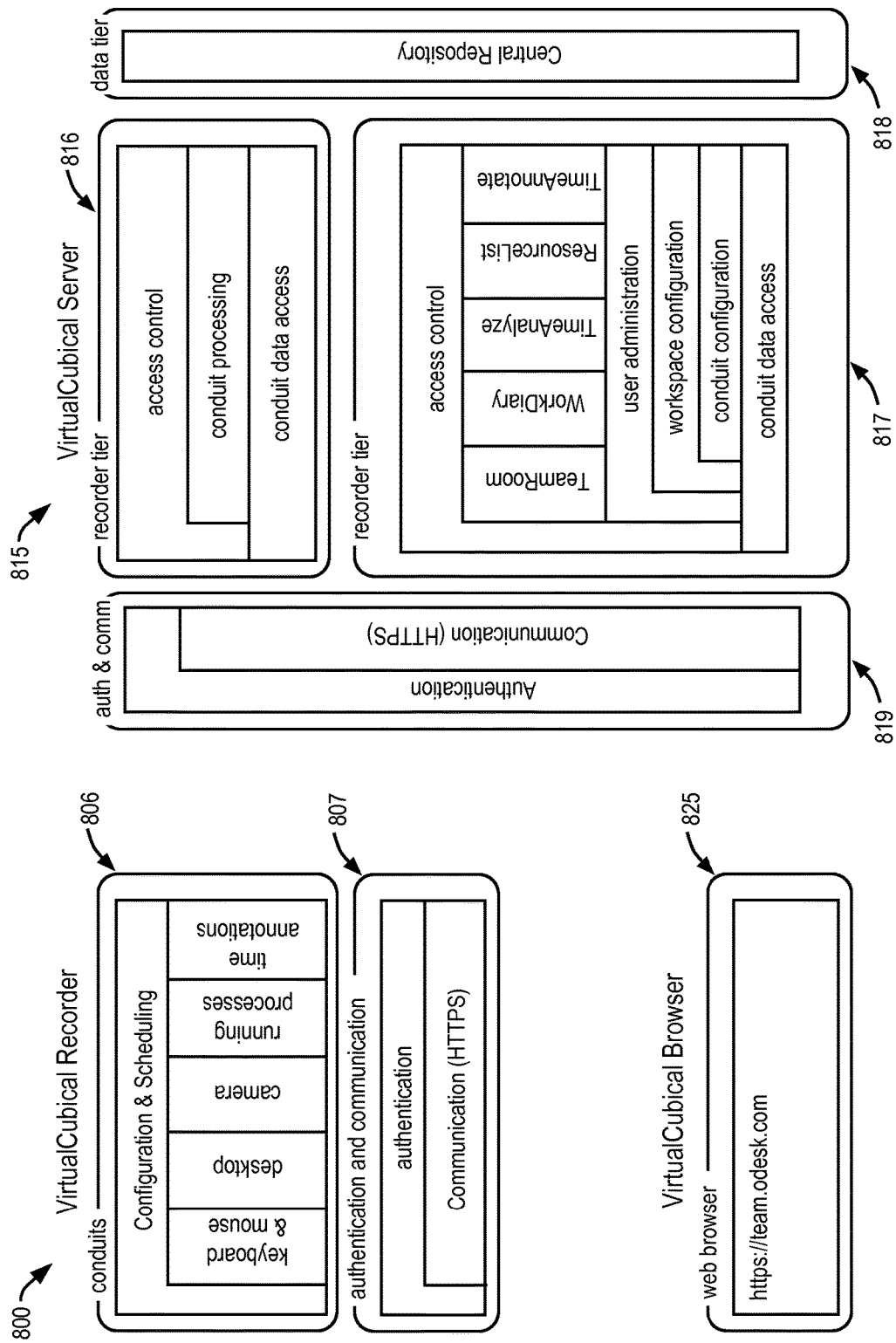
FIG. 8 illustrates an embodiment including various components for recording and storing user activity.

Another exemplary embodiment is shown in FIG. 8. This embodiment (800) includes a recorder in communication with a server. The embodiment (800) illustrates various modules of the recorder (805) including a conduits module (806) and an authentication and communications module (807). The conduits module (806) can further include a configuring and scheduling module. The configuring and schedule module can be configured to control recording of one or more of keyboard strokes, mouse clicks, camera stills or videos, or other user activities including task descriptions, user comments, client information and process logs, assessments of active windows and active run times for active windows.

In some embodiments, an authentication and communications module (807) can include a configurable system conduit that can comprise a system to configure the user activity that needs to be captured, a system to record the user activity, a system to configure a time period during which the user activity needs to be captured, a system to configure a mode of access to the analyzed user activity data. The mode of access to the analyzed user activity data can further comprise a system to configure a workspace for one or more user computers. The workspace can further comprise a system to configure selective permissions for the user computers to access the analyzed user activity data.

The exemplary embodiment of FIG. 8 can also include a recorder tier module (816), a presentation tier module (817), a data tier module (818) and an authentication and communications tier module (819). The recorder tier module (816) can be used to analyze the user activity data. The presentation tier module (817) can be used to store the user activity data in one or more patterns. The data tier module (819) can be used to archive the recorded user activity data in one or more patterns in a central repository. A central repository (818) in communication with one or more requestors via the authentication and communications tier module (819) can be configured to provide user activity data to the requester. While FIG. 8 illustrates a central repository (818), one of ordinary skill in the art would recognize that distributed repositories could be used without departing from the spirit and scope of this disclosure.

The embodiment shown in FIG. 8 further illustrates a browser. In some embodiments, the browser can be used to review recorded data and to administer a server. One of ordinary skill in the art would recognize any web browser, or communication client can be used.

Further embodiments of the invention may include the use of a virtual cubicle, wherein the virtual cubicle may be a software service comprising client software running on a user's computer and a server software hosted by a server computer that communicates with the client to provide a web accessible view of the user's computer activity while in the cubicle.]

Using such a system is beneficial in that it provides a user-controlled, always-on, bandwidth-efficient "videotaping" of the virtual cubicle. The use of the terms "videotaping" or "videotape" herein will be understood by one of ordinary skill in the art to include any form of image capture and storage of the same in any format available; the terms are not limited to systems using a tape based recording system. Nor are the terms limited to full motion video systems. In various embodiments of the invention, the videotapes may include images associated with a user's most recently active desktop, a webcam video image or image stream, an application accessed or worked on by a user, keyboard and/or mouse activity and/or idleness, as well as any other image that might be helpful in allowing an employer to monitor the quality and/or quantity of the work being performed.

In further embodiments of the invention, an occupant of a virtual cubicle is able to control of the "videotaping" of the virtual cubicle. By allowing the user to control the monitoring of the virtual cubicle, the user is provided with the ability to have privacy breaks, for personal or other reasons. By being able to control the monitoring a user can also guarantee that no information is communicated while in such a privacy mode. This will allow users to feel much more comfortable in using a system in which they are being monitored while working.

In a further embodiment of the invention, a user can retroactively remove previously captured images, thereby protecting private time that was mistakenly captured.

In a further embodiment of the invention, a user can select a "teamroom" that his cubicle is associated with, thereby enabling him to work for multiple employers switching between them as needed such that each employer only has access to the images recorded while the cubicle was part of that employer's teamroom.

In a further embodiment of the invention, a user can create a customer memo which describes the activity being performed while a particular image or set of images was recorded. In some aspects of the invention, the user can create the customer memo in real time or he can retroactively associate the memo with the recorded image or images. In another embodiment of the invention, the user may create one or more tags which characterize an activity being performed, and these tags may be associated with the captured images. In some systems a manager of the virtual cubicle system may be able to add additional memos or tags to the images.

In further embodiments of the invention, a manager of the virtual cubicle system may record all of the data captured by a monitoring system such that the user is not able to change or access this data. In some instances the user may be able to delete the information available to a client, but not the information available to the manager. This may allow the manager to independently evaluate the user's efficiency and or the accuracy of the data should it later come into question. It is not always necessary to inform the user that the manager is recording or saving additional data.

In a further embodiment of the invention, the "videotape" may be created using a sampling algorithm that takes full resolution (lossless) random snapshots of a user's screen in low frequency (perhaps, approximately once every few minutes), and then applies multiple compression algorithms (such as jpeg for screens with lots of images, png for screens covered mostly with windows and text or delta-based during times of low screen activity where the delta of the screen from the last snapshot made is used). In a further embodiment of the invention, the compression method to be used may be selected on the fly. Higher frequency low resolution screenshots of both the screen and the webcam can be taken to provide a simulated near-real-time experience.

In a further embodiment of the invention, if the user uses multiple computers, the monitoring software may be able to "follow" the user automatically, making sure that the recorded data reflects the computer that the person is working on during the recording of the data.

In a further embodiment of the invention, if a user uses one computer with multiple monitors the software may be capable of either "following" the user to the monitor what he is more actively working on or take a snapshot of all monitors following the geometry used by the individual to setup the multiple monitors.

In a further embodiment of the invention, the videotape may be made "tamper-proof" while providing full control of the "taping" to the user. In an exemplary system, this may be done by using "time slot" based capturing (e.g. 10:00:00-10:09:59, 10:10:00-10:19:59 . . . ), which guarantees that at least one random slot in each timeslot (slot by slot re-play/display across multiple virtual cubicles may be enabled). Using such a system a user logging in at 10:08:00 has only 20% chance of getting that slot "10:00:00-10:09:59."

Using such a system provides additional advantages in that even though a user is aware (after the fact) of the capture and can delete the capture if they want or logout right after a capture such actions cannot influence the resulting tape to create a statistically unfair view of the person's work. For example, if the person worked 40 hours during a week and spent 30% of his time in non-work related activities, the person cannot influence the system to create more than 28 hours of captured work in that week.

A further embodiment of the invention may use an algorithm to ensure that the tape is not altered. Such an algorithm may include: determining a random value (for example, 1-600) immediately following an image capture to determine the time of the next capture.

In a further embodiment of the invention, if multiple random captures are taken for a particular slot, one of the captures can be chosen for display after the end of the slot.

Additional protection of the integrity of the system can be achieved by allowing a user to delete only an entire slot and not individual contents of the slot. That way, a user will not be able to selectively manipulate the data to make himself appear more productive than he actually was.

A further embodiment of the invention may include the use of a "screensnap" as a way to capture data associated with a user. A screensnap may include, but is not limited to, a capture of keystroke count, mouse click count, the name of the topmost application, the title of the topmost window, a process list, and/or unique computer identification info such as guide or versions, for example. The screensnaps may be taken at a regular interval, for example, every minute, or they can be taken randomly or according to an algorithm as detailed above.

A further embodiment of the invention may include capturing additional screensnaps of specific events. These events may be events that are predetermined to be significant, such as when a user: logs in, logs out, switches from an idle to active mode, or switches to a specific application.

In a further embodiment of the invention, the system may also capture additional information such as a map of keyboard and mouse click counts as a measure of user activity, a percent of a time-slot in which mouse of keyboard activity was occurring.

In a further embodiment of the invention, the recording, transmitting and/or storing of data related to a user is done in a bandwidth and CPU efficient manner such that the data monitoring can be used continuously, or "always on," without having a perceived negative effect by the user, employer or system manager. Also the recording, transmitting and/or storing of data is done is such a way as not to affect the performance of the computers being utilized. In a further embodiment of the invention, the software associated with the system may be operable on all known or developed operating systems. In a further embodiment of the invention, it is possible for the system to lower the portion of the bandwidth being used by throttling down the bandwidth. In one embodiment of the invention, a user or other individual may specify the portion of the available bandwidth that is to be dedicated to the monitoring system, and the system may then automatically adjust various parameters of the monitoring such that the specified bandwidth is not exceeded. A user, for example, may specify the portion of the bandwidth as a percentage of the available bandwidth or as an amount of bandwidth. In one aspect of the invention, the system is able function using only a small amount of upstream bandwidth, such that a 28.8 kbs modem is adequate.

Another embodiment of the invention uses only HTTP traffic such that it can work behind any firewalls including proxies. According to yet another embodiment of the invention, the amount of storage required for storing a year's worth of tape is small that the system is designed to store all of the old data rather than being forced to delete it.

Because it is recognized that network connectivity is not always ideal and that user's in remote geographical locations may not have access to stable network connections; a further embodiment of the invention is designed to operate in cases where network connectivity is not reliable. To accommodate an unreliable network, when there is no internet connectivity the software may automatically switch to "offline mode." A switch to an off-line mode may be transparent to the user, such that from the perspective of the user, complete functionality is available in offline mode. While in the off-line mode, data continues to be captured in the same way as it was in an on-line mode; user's are still able to add/change memos, switch teamrooms, logout and/or login. When a connection is re-established, the system may automatically upload the accumulated data. According to various embodiments of the invention, the upload of data may be done in many ways, for example asynchronously over a period of time or in batches, such that even a brief window of connectivity can be used to transfer data. By transferring data in these various ways, a swamping the user's bandwidth is prevented. In order to prevent a user from tampering with data that has yet to be transmitted, the system may encrypt the data on the user's machine. According to a further embodiment of the invention, a user can be given manual control of the uploading of data. This may allow the user to more effectively use the bandwidth available to him.

According to a further embodiment of the invention, a system is provided which makes the recorded data available in real time. The data may also be organized historically to allow for efficient review of specific date or time periods. The data may be made available to the user, an employer or the system manager, and may also be viewed using the teamroom system previously detailed.

According to a further embodiment of the invention, teamrooms are provided which efficiently display a multitude of virtual cubicles. The teamrooms may be refreshed dynamically. A user browsing a teamroom may zoom into any of the virtual cubicle. Zooming in, may be done using a single mouse click or keystroke, and may be used to view the most recently snapped full size screenshot or streaming video. The teamroom system may also allow a user to take a snapshot of a current screen of any of the virtual cubicles. The teamroom system may also allow a user to switch to a "live mode" which may initiate and/or display a previously initiated real time screen-capture. A user may be able to terminate or deny the initiation of a real time monitoring.

According to a further embodiment of the invention, a date or calendar based historical review is enabled to allow a user to browse the data, possibly including snapshots, by date or time. Furthermore, a tagging mechanism may be enabled to allow searching of stored data for any data associated with a particular tag as described above.

According to a further embodiment of the invention, a system may enable displaying multiple user screens over a given time period to allow a comparison between the users. Also, the system may enable the display of a graph that displays an activity measure of at least one of the users over a specific time span, for example the past 24 hours. A display may also include a depiction of the local and remote time of day for that corresponds to each of the users and/or the team room. This display may appear in a calendar view as well. According to a further embodiment of the invention, a customizable (inlaid or fully blown) display of the webcam on top of the screenshot may also be enabled.

According to a further embodiment of the invention, a system may be enabled to analyze and provide reporting data related to archived activities. Such data may be presented in various formats, for example by group or by time (day/week/month). To enhance the usefulness of the data, it may be filtered according to various properties, for example: no filtering (showing all of the data); showing only active users; showing idle users; showing data for users having at least a predetermined level of activity; showing data for users having less than a predetermined level of activity; and/or filtering by tags associated with the data. According to a further embodiment of the invention, data can be compared across multiple virtual cubicles.

According to a further embodiment of the invention, a system may enable text searching of archived data. This may be coupled with, or enabled by, applying character recognition (OCR) to captured screens; using installed fonts to fine tune an OCR algorithm; adjusting for font aliasing, such as underlining; producing and archiving OCR-generated text from selected screen shots, or all screen shots; keyword searching of part or all of the stored data; or advanced searching, including field matching against screenshot metadata, for example title, application, activity measure, etc.

According to a further embodiment of the invention, the integrity of the data is ensured by performing fraud pattern detection heuristics on the captured data. This protection may include detecting repetitive patterns or keyboard or mouse activity not resulting in a screen change. Comparing the metrics of various aspects of an activity profile against a team or an average of all virtual cubicle occupants may also be performed.

According to a further embodiment of the invention, a system is provided that allows a teamroom manager to arrange users and supervisors such that a user can have one or more supervisors, a supervisor may supervise any number of users an a user may belong to a department.

According to a further embodiment of the invention, a system is provided that allows a teamroom manager to customize a privacy functionality of a virtual cubicle. The customization may include allowing the manager to create "custom cubicles" (e.g. war-rooms, cubicles with glass doors, cubicles with no doors, cubicles with doors having a bell, etc.), wherein the cubicle descriptions are intended to describe a functionality of the virtual cubicles by relating them to real cubicles, rather than to limit the actual virtual cubicles. These custom cubicles may have multiple custom privacy modes. The supervisor may assign specific cubicle types to individual users or on a group or class-wide basis. The cubicle occupants may be allowed to switch to one of a plurality of privacy modes, for example an open or closed door cubicle.

According to a further embodiment of the invention, each privacy mode defines who may access what information while a virtual cubicle is in that mode. For example, the mode may determine which capturing devices are enabled, what data a manager is able to access, what data other users in a department or work group are able to access; what data users outside of a department or work group are able to access, and/or what data a supervisor is able to access.

According to one embodiment of the invention, a cubicle may be defined as a classic cubicle. A classic cubicle may be further defined in that a user can set a privacy mode to open door or closed door. In a closed door cubicle only the supervisor may have access to captured data, while in an open door cubicle users in the same department may be granted full access, while remaining users in the same company may be granted access to more limited data, such as a low-res view of the screen or a thumbnail view.

According to a further embodiment of the invention, a system may be provided that enables capturing of sound data in addition to the video data. In some instances, the system may merge all or some of the sounds at some or all of the virtual cubicles associated with a teamroom. Systems using a sound capturing feature may allow a user to select specific cubicles and listen to sound data associated therewith.

According to additional embodiments of the invention, a system using virtual cubicles similar to those described above may use virtual "time cards" to improve or enable time-based work and/or billing between two remote parties, a buyer and a provider. In such a system, virtual cubicle reports may be used to provide provable timesheets/timelogs which may be audited by the recorded data. A user may be granted access to self-management controls of a virtual cubicle. These controls may be related to timecard punch-in/punch-out. A user may be given the ability to connect to a teamroom or resume data collection or to disconnect from a teamroom or suspend data collection. A user may be given the accessibility to a timesheet which may be filled out by the user, and the timesheet may be linked to memos describing the timeslots, and may be filled out manually or automatically by the system in real time.

According to additional embodiments of the invention, a user may be enabled to review and submit timesheets at various point, for example: after the work is performed; as the work is performed; or following a review of a workdiary. The system may enable the user, a supervisor or a manager to delete time, edit memos and/or generate preview reports for a chosen time period. In various embodiments of the invention, the system automatically generates timelog draft timesheets for review based on the Virtual Cubicle activity. These timesheets may be generated, for example, on an end-of-week basis. A further system may automatically generate provider timelogs and invoices to the buyer based on the reviewed activity, and may automatically archive the invoice. These functions may also be enabled to allow for manual generation and/or control, based on the desires of the buyer.

By automatically archiving the timelogs as read-only data, the work history becomes non-disputable proof-of-work. The system may also provide hyperlinks for timesheet/timelog entries that may navigate back to the specific time point in the read-only captured data. By providing this information to the buyer, the buyer is given the full information needed to approve or reject a timelog based on whether the captured data shows a provider performing a task described in the timesheet. A provider then may charge the buyer for the hours of work performed, and the buyer, being able to verify that the work was performed, may compensate the provider for the hours of work actually performed and verified.

According to additional embodiments of the invention, a system may be provided to serve as a "global staffing firm" to enable individuals to log working hours for remote employers. The system may recruit and train providers on the use of the Virtual Cubicle and guidelines of being a good remote worker. The system may be used as a central provider with whom providers establish contractual relationships. The providers may specify an hourly rate for their services. This rate may be incorporated to a charge for services that is provided to a buyer such that service fees of the system are transparent to the buyer and hidden costs are eliminated. Providers may optionally be provided with a system debit card or a similar device, such that payments for services rendered are wired to the device. Payments may also be wired to specified bank accounts.

According to additional embodiments of the invention, providers may be required to take online tests provided by the system. The providers may then be ranked or categorized based on their skills as proven during testing. The testing may involve any skills determined by the system, the provider or a buyer. The tests may be proctored by staff supplied by the system and/or taken in a virtual cubicle to further ensure the trustworthiness of the results.

According to additional embodiments of the invention, providers are able to apply to relevant job openings posted by the system. The providers may also wait to be discovered by interested buyers to whom lists of providers are supplied by the system. Buyers register with the system and may sign contract with the system. Buyers may search the supplied providers to find appropriate matches. Buyers may post job openings and wait for providers to apply. Buyers may interview and hire qualifying providers using the system. A virtual cubicle may be automatically provided for the provider in the buyer's teamroom. A provider and a buyer may be able to negotiate the price of the provider's services. A provider may be engaged to work on assignments on a time or work product basis. For example if a weekly basis is chosen, the buyer gets billed and the provider gets paid based on that weekly basis. In other examples, the cycles of charging and paying may be biweekly, monthly or independent from time.

According to additional embodiments of the invention, when an assignment ends, the buyer and the provider rank each other and provide feedback for each other to the system to aid the system in making appropriate matches in the future.

According to additional embodiments of the invention, auditable histories may be used to establish a fact-based profile and a fact-based marketplace of remote buyers and providers. The system may provide the history of assignments of the providers and buyers to other selected members of the system. Data provided may include: assignment history; which buyer work was performed for; the number of hours worked; the hourly rate the provider worked for; the position the provider was hired for; the position the provider reached; and/or the results of the provider's testing. The system may also supply a provider's interviewing activity, number of active interviews and/or the positions the provider was offered or rejected from.

Similarly, the system may also provide selected providers with data related to assignments of selected buyers and recruiting activity of the buyers. The data provided may include: assignment history; which providers the buyer worked with; representative statistics or information relating to the qualifications of the providers worked with; hours worked by the providers; the hourly rate of the providers that were worked with; what job openings the buyers have previously filled; the feedback of previous providers; the jobs currently available; which other providers were interviewed; which providers were rejected; and/or information related to the qualifications of the hired and rejected providers.

According to additional embodiments of the invention, the system may be designed to support arrangements between groups of individuals. For example, a company owner may register as an affiliate that will supply its own employees as individual providers. The rates, interviewing, and negotiation may be managed by an Affiliate Manager. Feedback related to the affiliate's providers may be aggregating to form an affiliate ranking. An aggregate fact-based profile containing corresponding data may be automatically maintained for the affiliate. The affiliate may receive the compensation from a buyer and be responsible to handle individual compensation to its internal providers.

According to additional embodiments of the invention, a system may be provided which enables flexible payment relationships. For example, the system may provide complex time-based relationships instead of hourly based relationships. These relationships may include budget capped contracts that cap hours based on a timed basis (e.g. daily/weekly/monthly), wherein the caps may be set for individual providers or groups of providers. The relationships may actively suspend the ability to bill extra time, such that the Virtual Cubicles do not allow work to be performed when a cap is reached. They may also provide an alert when a cap is approached/reached which may be supplied to both providers and buyers.

Alternate agreements may be based on a minimum number of hours to be paid, wherein a minimum amount of hours over a given time period are paid for even if the number of hours actually billed is lower or a fixed number of hours to be paid over a given time period in addition to the number of hours billed. Certain agreements may require exclusivity, such that the provider is not visible/available to other system users. A minimum project size or minimum assignment duration may be agreed upon. Advance warning as to when an assignment is going to end may be required, and minimum compensation may be agreed upon. Various agreements may enable a buyer to provide a bonus to individual providers or to groups of providers.

According to additional embodiments of the invention, groups of providers are enabled to be linked together such that a provider may recommend one or more other providers and be responsible for them. In such systems, the success (in terms of feedback ratings, skill test scores, etc.) of the recommended providers may be reflected in the profile of the recommending provider. The recommending provider may receive a royalty commission on future payments to the recommended providers. The recommended provider may further recommend providers of their own. A commission scheme may be incorporated which may follow a multi-level formula enabling a provider to make a commission from providers indirectly recommended by them. The system may provide the success and commissioning schemes used as a part of the provider's profile. Providers may move to a different recommender or to no recommender at all.

According to additional embodiments of the invention, a system may be used that is integrated existing internet search engines or third party websites such that the system identifies posted job openings and matches them to providers, or that matches posted providers with buyers that are internal to the system.

According to additional embodiments of the invention, a virtual cubicle may be integrated with collaboration tools to create a complete Collaboration Environment. This collaboration environment may include: client chat, web chat, conferencing, team chatrooms, third party voice over IP integration. The system may enable the use of: screensnaps, shorturls, minicams, presence, task management, project management, screen sharing, dashboarding, file sharing, document co-authoring, emails, email lists, forums, calendaring, scheduling, and/or third party desktop gadget integration.

According to additional embodiments of the invention, a virtual cubicle software program may be equipped with applications such as: developer tools; bug tracking tools; version control; virtual servers; integrated bug tracking and teamroom tools; integrated version control and bug tracking; technical writing tools; and/or issue tracking tools.

According to additional embodiments of the invention, a deep collaboration tool and application is integrated into a virtual cubicle. This integration enables: automatic provision of an account on registration; automatic management of rosters of friends or other groups at various points such as assignment start/end and interviewing; inclusion of real time URL links to all relevant points; making all past historical resources URL addressable; single sign-on such that web accessible resources are accessible after a single login and inaccessible after a logout; and/or a teamroom manager.

According to additional embodiments of the invention, a user management system is enabled that allows self administration and access control and provides various integration points identified above as a platform, such that buyers and providers can select various applications and tools to be enables in a Virtual Cubicle. The applications in tools enabled in the virtual cubicle may be recorded along with the work history. Productivity metrics may be enhanced by including application specific data therein.

The use of the terms "and" and "or" in the specification are not intended to be limiting terms and should be interpreted accordingly as "and/or" unless otherwise specified.

We claim:

1. A networked system, comprising:
a server connected via a network to a plurality of remote computers accessed by providers and buyers, the server configured to:
provide profiles of providers to a remote computer of a buyer, the profiles including information for hiring the providers; and
receive over the network, from the remote computer of the buyer, selection of a provider and assignment of a task to the selected provider responsive to providing the profiles of the providers, the task including a manual operation by the selected provider; and
a remote computer used by the selected provider, the remote computer configured to:
sample and store user activity data when the remote computer used by the selected provider has no network connectivity, the user activity data representing activities on the remote computer associated with the assigned task, wherein the sampling includes using a sampling algorithm that performs uninterrupted monitoring by taking first random snapshots in a higher resolution of the user activity in a lower frequency and taking second random snapshots in a lower resolution of the user activity in a higher frequency; and
transmit over the network the stored user activity data to audit or evaluate performance of the task by the selected provider, wherein the transmitting includes automatically uploading the stored user activity data when the remote computer used by the selected provider establishes network connectivity.

2. The system of claim 1, wherein the user activity data comprises at least one of keystrokes, mouse clicks, still camera images of the provider, videos of the provider, and screen captures.

3. The system of claim 1, wherein the user activity data is sampled at random time intervals for storing at the server.

4. The system of claim 1, wherein the server is further configured to grant access to the provider to edit the stored user activity data before transmitting the stored user activity data.

5. The system of claim 1, wherein the user activity data cannot be manipulated by the provider before sending the stored user activity data.

6. The system of claim 1, wherein the remote computer used by the provider stops sampling the user activity data responsive to placing the remote computer in a privacy mode.

7. The system of claim 1, wherein the server is configured to determine the efficiency of the provider based on the user activity data.

8. The system of claim 7, wherein the server is further configured to determine compensation of the provider based on the stored user activity data.

9. The system of claim 1, wherein the server is further configured to grant access to the remote computer of the provider over the network responsive to the selection of the provider.

10. The system of claim 1, wherein the server is further configured to store online tests for evaluating the providers, results of the online test stored in the profiles of the providers.

11. The system of claim 1, wherein the server is further configured to send buyer information to the provider responsive to receiving a request from the provider.

12. The system of claim 1, wherein the server is further configured to:
generate a profile for each of the providers accessing the network system;
receive feedback regarding performance of the assigned task; and
update a profile of the selected provider based on the received feedback, the updated profile accessed for selection of the provider and assignment of another task to the selected provider.

13. The system of claim 1, wherein the profile comprises at least one of qualifications of the providers, number of hours worked on tasks assigned by the networked system, hourly rates of the providers, and histories of assignments assigned to the providers by the networked system.

14. The system of claim 1, wherein the higher resolution comprises a full resolution.

15. The system of claim 1, wherein the lower frequency comprises longer than a minute.

16. The system of claim 1, further comprising compressing the random snapshots in the higher resolution using one or more multiple compression algorithms.

17. A method, comprising:
sending, by a server, profiles of providers to a remote computer of a buyer for selecting a provider and assigning a task to the selected provider, the profiles including information for hiring the providers;
responsive to sending the profiles of the providers, receiving over a network, at the server, a selection of the provider and an assignment of the task to the selected provider from the remote computer of the buyer, the task including a manual operation by the selected provider;
sampling and storing, by a remote computer that is used by the selected provider, user activity data when the remote computer used by the selected provider has no network connectivity, the user activity data representing activities on the remote computer associated with the assigned task, wherein the sampling includes using a sampling algorithm that performs uninterrupted monitoring by taking first random snapshots in a higher resolution of the user activity in a lower frequency and taking second random snapshots in a lower resolution of the user activity in a higher frequency; and
transmitting over the network, by the remote computer used by the selected provider, the stored user activity data to evaluate or audit performance of the task by the selected provider, wherein the transmitting includes automatically uploading the stored user activity data when the remote computer used by the selected provider establishes network connectivity.

18. The method of claim 17, further comprising:
generating a profile for each of the providers accessing the network;
receiving feedback regarding performance of the assigned task; and
updating a profile of the provider based on the received feedback, the updated profile accessed for selection of the provider and assignment of another task to the provider.

19. The method of claim 18, further comprising:
analyzing the user activity data for determining productivity of the provider; and
determining compensation to the provider based on the productivity of the provider.

20. The method of claim 17, wherein the profiles comprise at least one of qualifications of the providers, number of hours worked on tasks assigned to the providers using the network, hourly rates of the providers, and histories of assignments assigned to the providers via the network.

21. The method of claim 17, wherein the user activity data comprises at least one of keystrokes, mouse clicks, still camera images of the provider, videos of the provider, and screen captures.

22. The method of claim 17, wherein the remote computer used by the provider samples the user activity data at random time intervals for storing.

23. The method of claim 17, wherein the remote computer used by the provider stops sampling the user activity data responsive to placing the remote computer in a privacy mode.

24. The method of claim 17, wherein the sampling comprises following the provider, such that the user activity data reflects the computer that the provider is working on during the sampling of the user activity data.

25. The method of claim 24, wherein the following comprises following the provider to a monitor of a plurality of monitors that the provider is more actively working on.

26. The method of claim 24, wherein the following comprises taking snapshots of all monitors that the provider is working on.

* * * * *